(12) United States Patent
Colombo

(10) Patent No.: US 11,113,136 B2
(45) Date of Patent: Sep. 7, 2021

(54) PROCESSING SYSTEM, RELATED INTEGRATED CIRCUIT AND METHOD

(71) Applicant: STMicroelectronics Application GMBH, Aschheim-Dornach (DE)

(72) Inventor: Roberto Colombo, Munich (DE)

(73) Assignee: STMicroelectronics Application GMBH, Aschheim-Dornach (DE)

( * ) Notice: Subject to any disclaimer, the term of this patent is extended or adjusted under 35 U.S.C. 154(b) by 209 days.

(21) Appl. No.: 16/289,405

(22) Filed: Feb. 28, 2019

(65) Prior Publication Data

US 2019/0272210 A1 Sep. 5, 2019

(30) Foreign Application Priority Data

Mar. 2, 2018 (IT) .................. 102018000003234

(51) Int. Cl.
*G06F 11/00* (2006.01)
*G06F 11/07* (2006.01)
*G06F 11/10* (2006.01)

(52) U.S. Cl.
CPC ...... *G06F 11/0784* (2013.01); *G06F 11/0721* (2013.01); *G06F 11/0739* (2013.01); *G06F 11/0751* (2013.01); *G06F 11/0772* (2013.01); *G06F 11/1048* (2013.01)

(58) Field of Classification Search
CPC ............. G06F 11/0766; G06F 11/0769; G06F 11/0772; G06F 11/0775; G06F 11/0781; G06F 11/0784; G06F 11/321; G06F 11/322; G06F 11/326; G06F 11/327; G06F 11/14; G06F 11/1479; G06F 11/16; G06F 11/22; G06F 11/00; G06F 11/30

USPC ......................................... 714/1–57
See application file for complete search history.

(56) References Cited

U.S. PATENT DOCUMENTS

| | | | | |
|---|---|---|---|---|
| 2008/0016407 A1* | 1/2008 | Abernathy | .......... | G06F 11/3672 714/45 |
| 2011/0179314 A1 | 7/2011 | Patel et al. | | |
| 2013/0166993 A1* | 6/2013 | Lee | .......... | G11C 29/40 714/799 |
| 2014/0019814 A1* | 1/2014 | McNairy | .......... | G06F 11/263 714/49 |
| 2014/0058541 A1* | 2/2014 | Goepfert | .......... | G06F 11/0772 700/79 |

(Continued)

FOREIGN PATENT DOCUMENTS

WO 2010007469 A1 1/2010

OTHER PUBLICATIONS

STMicroelectronics, "AN4247 Application note Safety Manual for SPC570S family," Jul. 2015, DocID 024209, Rev 3, 61 pages.

*Primary Examiner* — Sarai E Butler
(74) *Attorney, Agent, or Firm* — Slater Matsil, LLP

(57) ABSTRACT

A processing system includes a plurality of circuits configured to generate a plurality of error signals. The processing system further includes a plurality of error pads and a fault collection circuit configured to receive the plurality of error signals and to generate a respective combined error signal for each of the plurality of error pads. The fault collection circuit includes a combinational logic circuit configured to generate the combined error signal by selectively routing the plurality of error signals to the plurality of error pads as a function of a set of configuring bits.

20 Claims, 7 Drawing Sheets

(56) References Cited

U.S. PATENT DOCUMENTS

| | | | |
|---|---|---|---|
| 2014/0325277 A1* | 10/2014 | Sonoda | G06F 11/263 714/27 |
| 2015/0278006 A1* | 10/2015 | Iikura | G06F 11/0706 714/2 |
| 2015/0370625 A1* | 12/2015 | Nakajima | G06F 11/0709 714/37 |
| 2016/0019131 A1* | 1/2016 | Biberdorf | G06F 11/0709 714/45 |
| 2016/0239663 A1 | 8/2016 | Healy et al. | |
| 2016/0266952 A1* | 9/2016 | Hofig | G06F 11/0751 |

* cited by examiner

PROCESSING SYSTEM, RELATED INTEGRATED CIRCUIT AND METHOD

CROSS-REFERENCE TO RELATED APPLICATIONS

This application claims the benefit of Italian Application No. 102018000003234, filed on Mar. 2, 2018, which application is hereby incorporated herein by reference.

TECHNICAL FIELD

Embodiments of the present disclosure relate generally to processing systems, such as micro-controllers.

BACKGROUND

FIG. 1 shows a typical electronic system, such as the electronic system of a vehicle, including a plurality of processing systems 10, such as embedded systems or integrated circuits, e.g., a Field Programmable Gate Array (FPGA), Digital Signal Processor (DSP) or a microcontroller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a Controller Area Network (CAN) bus, and possibly a multimedia bus, such as a Media Oriented Systems Transport (MOST) bus, connected to the vehicle control bus via a gateway. Typically, the processing systems 10 are located at different positions of the vehicle and may include, e.g., an Engine Control Unit (ECU), a Transmission Control Unit (TCU), an Anti-lock Braking System (ABS), a body control modules (BCM), and/or a navigation and/or multimedia audio system.

FIG. 2 shows a block diagram of a typical digital processing system 10 corresponding to any of the previously mentioned processing systems $10_1$, $10_2$ and/or $10_3$, such as a micro-controller.

In the embodiment considered in FIG. 2, the processing system 10 includes at least one processing unit 102, such as a microprocessor, usually the Central Processing Unit (CPU), programmed via software instructions.

In the example considered, the software executed by the processing unit 102 is stored in a non-volatile program memory 104a, such as a Flash memory or EEPROM. Thus, the memory 104a is configured to store the firmware for the processing unit 102, wherein the term firmware includes both the software of a micro-processor and the programming data of a programmable logic circuit, such as a FPGA. Similarly, the processing unit 102 may be associated with one or more volatile memories 104b, such as a Random-Access Memory (RAM), e.g. a Static Random-Access Memory (SRAM) or a Dynamic Random-Access Memory, e.g. for storing temporary results of the program executed by the processing unit 102. Generally, each memory 104a or 104b may be integrated with the processing unit 102 in a single integrated circuit, or the memory may be in the form of a separate integrated circuit and connected to the processing unit 102, e.g. via the traces of a printed circuit board.

In the example considered, the processing unit 102 may be associated with one or more further resources 106, such as:

one or more communication interfaces, such as an Universal Asynchronous Receiver/Transmitter (UART), Serial Peripheral Interface (SPI), Inter-Integrated Circuit (I2C), Controller Area Network (CAN), Ethernet, and/or debug interface; and/or one or more analog-to-digital and/or digital-to-analog converters; and/or one or more dedicated digital components, such as hardware timers and/or counters, or a cryptographic co-processor; and/or one or more analog components, such as comparators, sensors, such as a temperature sensor, etc.; and/or one or more mixed signal components, such as a PWM (Pulse-Width Modulation) driver.

Future generation processing systems, in particular microcontrollers dedicated to automotive applications, will exhibit a significant increase in complexity, mainly due to the increasing number of functionalities (such as new protocols, new features, etc.) and to the tight constraints concerning the operation conditions of the system (such as lower power consumption, increased calculation power and speed, etc.). For example, complexity is expected to increase in particular in the context of the forthcoming Car2X and autonomous driving world, because safety and security of the processing systems 10 will become more and more relevant.

For this reason, the processing units 10 should be able to correctly handle errors. For example, an error-correcting code (ECC) function of a memory of the processing system 10 may detect and possibly corrects data errors affecting the memory. Similarly, other fault-detection functions may permit system-level diagnostics of the timers, ADC, communication interfaces and/or other modules.

In response to an error, the processing system may generate interrupts and/or resets. In various applications it may be necessary that one or more errors should also be reported to other processing systems. For example, when an error signal is received, the processing system 10 may drive an error pin according to given protocol, thereby helping to ensure safety and reliability of the complete system.

SUMMARY

In view of the above, various embodiments of the present disclosure to provide solutions able to improve the behavior of a processing system, such as a micro-controller, in response to an error signaled by one of the circuits of the processing system.

According to one or more embodiments, one or more of the above objectives is achieved by a processing system having the features specifically set forth in the description that follow. Embodiments moreover concern a related integrated circuit and method.

As mentioned before, various embodiments of the present disclosure relate to a processing system. In various embodiments, the processing system includes a plurality of circuits configured to generate a plurality of error signals. For example, the error signals may be generated by:

a memory supporting an error detection and/or correction function;

a processing unit configured to generate an error signal in response to a hardware and/or software failure; and/or a communication interface configured to generate an error signal corresponding to a hard error signal indicative of a hardware failure and/or a soft error signal indicative of a data transmission error.

In various embodiments, the processing system includes a plurality of error pads and a fault collection circuit. Specifically, in various embodiments, the fault collection circuit is configured to receive at input the error signals and generate a respective combined error signal for each of the error pads. For example, in various embodiments, the fault collection circuit includes a combinational logic circuit configured to generate the combined error signal by selectively routing the error signals to the error pads as a function of a first set of configuring bits.

For example, in various embodiments, the combinational logic circuit includes a respective first combinational sub-circuit for each of the error signals. Specifically, each first sub-circuit is configured to receive at input a respective error signal and a first plurality of configuration bits, one for each error pad. Next, each first sub-circuit generates for each error pad a respective output signal by performing a first logic operation between the received error signal and a respective configuration bit of the first plurality of configuration bits. In various embodiments, the combinational logic circuit includes moreover a respective second combinational sub-circuit for each error pin, wherein each second combinational sub-circuit is configured to receive at input a respective output signal from each of the first combinational circuit and generates a respective combined error signal for the respective error pad by combining the received output signal via a second logic operation. For example, the first logic operation may be an AND operation, and the second logic operation may be an OR operation.

In various embodiments, the processing system includes moreover at least one safety-critical pad. Specifically, each safety-critical pad is associated with a respective interface circuit configured to set the electric level of the safety-critical pad as a function of a safety control signal. In this case, the fault collection circuit may be configured to receive at input the error signals and generate a respective safety control signal for each of the safety-critical pads.

For example, in various embodiments, the fault collection circuit includes a second combinational logic circuit configured to generate the safety control signal by selectively routing the combined error signals to the safety-critical pads as a function of a second set of configuring bits. For example, the second combinational logic circuit may include a respective combinational sub-circuit for each of the safety-critical pads. Specifically, each combinational sub-circuit is configured to receive at input the combined error signals and a second plurality of configuration bits and generate for each combined error signals a respective output signal by performing a third logic operation between a respective combined error signals and a respective configuration bit of the second plurality of configuration bits. Next, each combinational sub-circuit generates a respective safety control signal for the respective safety-critical pad by combining the respective output signals via a fourth logic operation. For example, the third logic operation may be an AND operation, and the fourth logic operation may be an OR operation.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
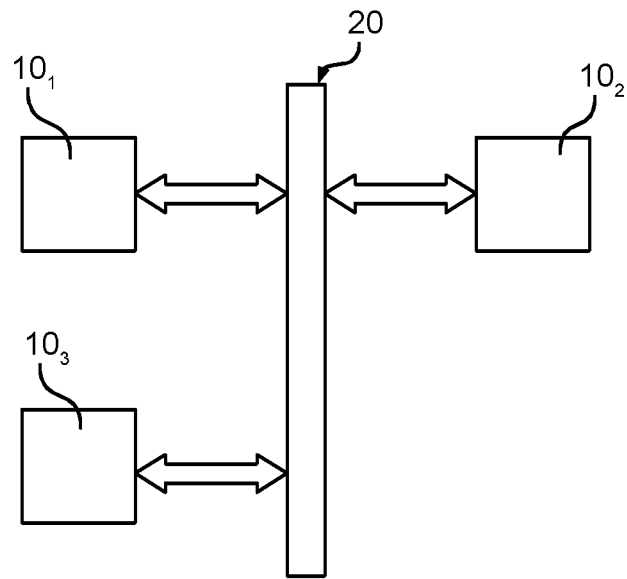
FIG. 1 shows a typical electronic system including a plurality of processing systems.
Figure 2:
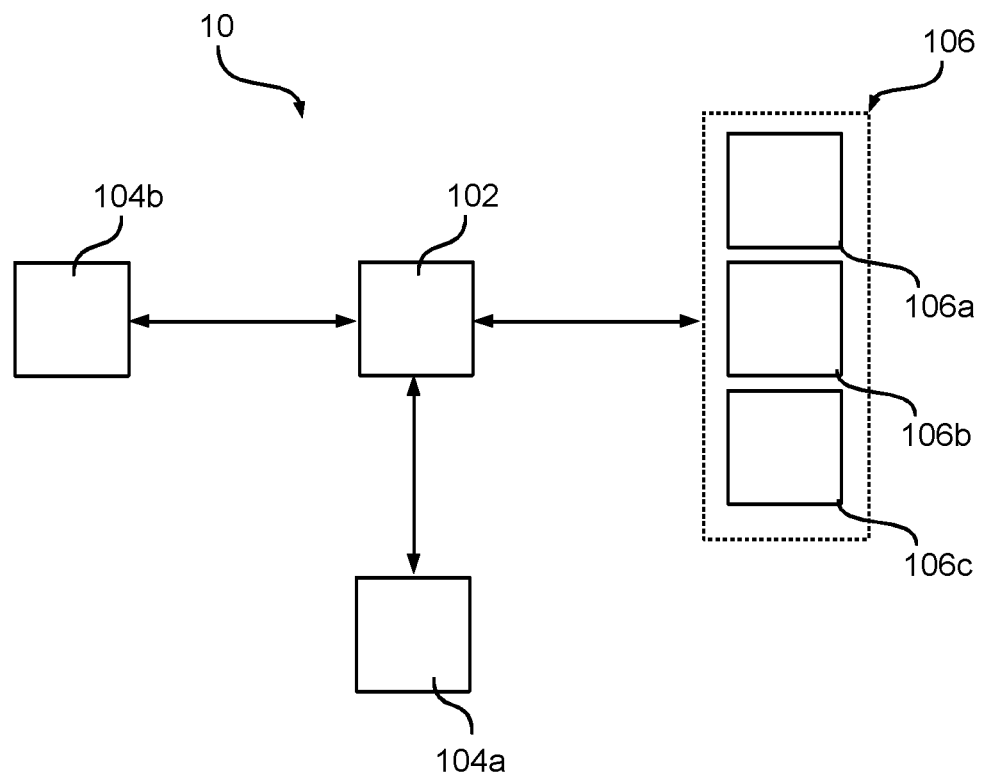
FIG. 2 shows an exemplary processing system.

In the following FIGS. 3 to 9 parts, elements or components which have already been described with reference to FIGS. 1 and 2 are denoted by the same references previously used in such Figures; the description of such previously described elements will not be repeated in the following in order not to overburden the present detailed description.

As mentioned before, various embodiments of the present disclosure relate to solutions for managing errors within a processing system.

Figure 3:
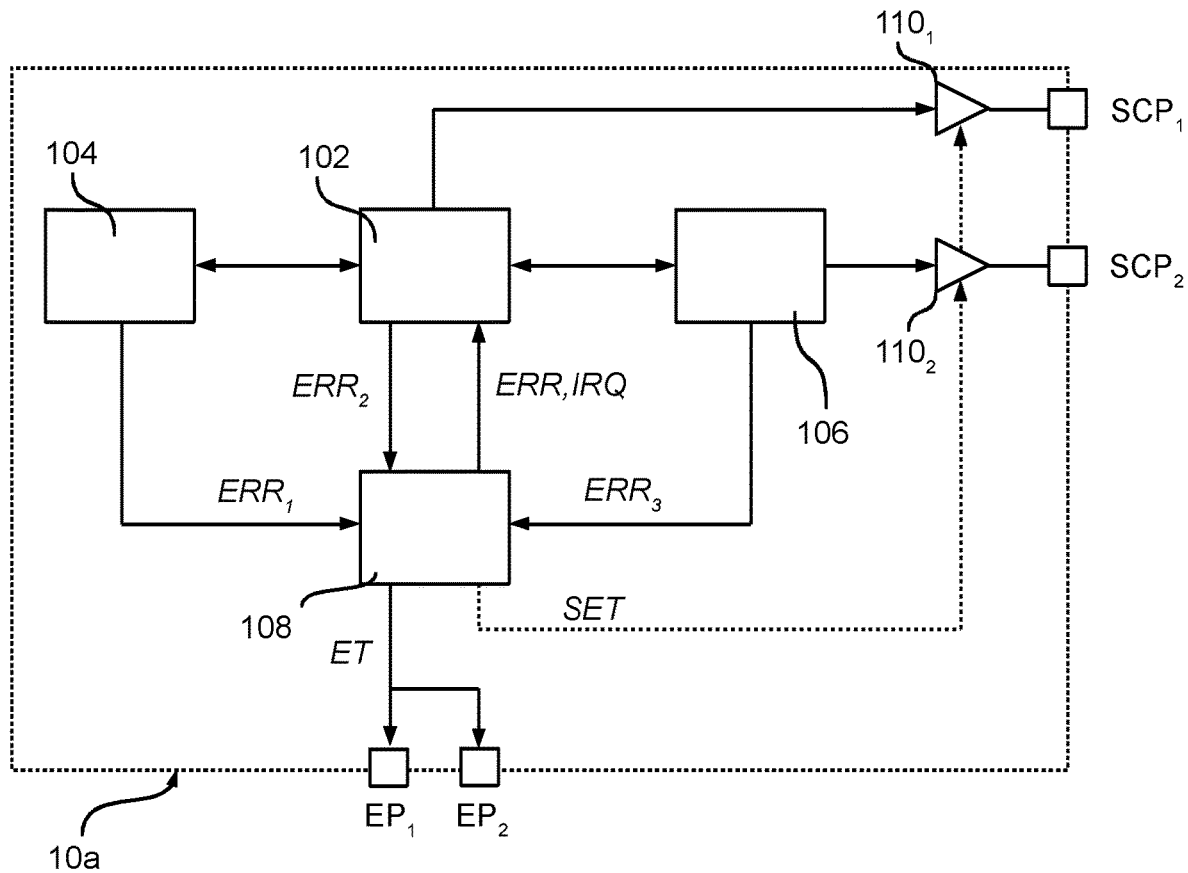
FIG. 3 shows an embodiment of a processing system including a fault collection circuit providing a combined error signal to an error pin.

FIG. 3 shows an embodiment of a processing system 10*a* including a processing unit 102, one or more memories 104, such as a non-volatile memory 104*a* and/or a volatile memory 104*b*, and possible one or more further resources 106. Accordingly, the description of FIG. 2 fully applies also to the system of FIG. 3.

In the embodiment considered, at least one of the blocks 102, 104 and 106 may generate at least one error signal ERR. For example, such error signals ERR may be generated by at least one of:

a memory 104 supporting an error detection and/or correction function, which generates an error signal ERR1 when the data read from the memory 104 contain errors and/or when data could not be written to the memory;

a processing unit 102 configured to generate an error signal ERR2 in response to a hardware and/or software failure;

a communication interface 106 configured to generate an error signal ERR3, corresponding to a hard error signal indicative of a hardware failure and/or a soft error signal indicative of a data transmission error.

Additionally or alternatively, error signals may be generated by monitoring the supply voltage of the processing system 10*a* (e.g. in order to detect over and/or under voltage conditions), the clock signal of the processing system 10*a* (e.g. in order to detect the absence of a clock signal), and/or the temperature of the processing system 10a (e.g. in order to detect whether the current operating temperate is out of range).

In the embodiment considered, the various error signals ERR are provided to a fault collection circuit 108.

Specifically, in the embodiment considered, the fault collection circuit 108 is configured to generate an error trigger signal ET, which is provided to an error pad/pin EP of the integrated circuit including the processing system 10a. Generally, the term integrated circuit does not imply that the die is mounted within a package, but e.g. the die could also be mounted directly on a printed-circuit-board (PCB). Thus, the term pad is used to identify the pad of the die of the integrated circuit and the term pin identifies the pin or lead of an optional external package of the integrated circuit. Thus, when using the term "pad/pin" this indicates that the die has a pad and in case an external package is used, also the package has a corresponding pin, which is connected to the respective.

In various embodiments, the fault collection circuit 108 may also provide the error signal(s) ERR to the processing unit 102 and/or to one or more of the resources 106. For this purpose, the fault collection circuit 108 may also generate one or more interrupt signals IRQ, which are provided to the processing unit 102.

Figure 4:
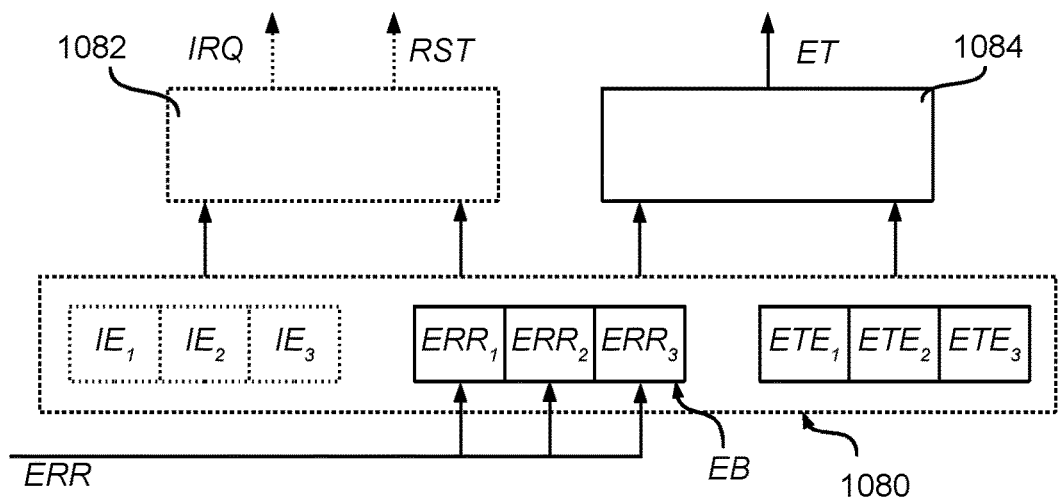
FIG. 4 shows a first embodiment of the fault collection circuit of FIG. 3.

For example, FIG. 4 shows a possible embodiment of the fault collection circuit 108.

In the embodiment considered, the fault collection circuit 108 includes a register 1080. Specifically, in the embodiment considered, the register 1080 includes one or more error bits EB for storing the value of the error signals ERR. For example, considering the exemplary case of three error signals ERR1 . . . ERR3, the register 1080 may include a corresponding number of error bits EB.

In the embodiment considered, the fault collection circuit 108 includes also an error trigger generator circuit 1084. Specifically, the error trigger generator circuit 1084 is configured to generate the error trigger signal ET as a function of the content of the error bits EB of the register 1080. The error bits EB are purely optional and the error trigger generator circuit 1084 may generate the error trigger signal ET also directly as a function of the error signal(s) ERR.

In various embodiments, the behavior of the error trigger generator circuit 1084 may also be programmable, e.g. by setting one or more configuration bits in the register 1080. For example, in the embodiment considered, the register 1080 includes a respective error trigger enable bit ETE for each of the error signals ERR1, ERR2, ERR3. For example, in various embodiments, the content of these error trigger enable bits ETE may be programmed by the processing unit 102 and/or during a configuration phase of the processing system 10a, e.g. by reading the corresponding configuration information from a non-volatile memory, such as the memory 104a.

Thus, essentially the signal ET corresponds to a combined error signal determined by combining the error signals ERR as a function of the error trigger enable bits ETE.

For example, by setting the error trigger enable bits ETE, the processing system 10a may be configured to signal only safety critical errors via the signal ET to the error pin/pad EP (such as uncorrectable data read errors, hardware failure of the processing unit 102 and/or one of the resources 106, etc.). Conversely, minor errors, which do not influence the safety of the system may not be signaled to the error pin/pad EP. For example, assuming a memory with error correction function, an uncorrectable error (e.g. a three bits error upon reading data from a non-volatile memory able to correct up to two-bit errors) may be:

- safety critical, e.g. when reading (fetching) code to be executed from the memory, insofar as this may result in an incorrect execution behavior; or
- not safety critical, e.g. when reading the data of a JPEG picture from the memory.

Accordingly, due to an error, the circuits of the processing system 10a may not operate correctly, possibly generating incorrect signals at the pins/pads of the processing system 10a. Some of the pins/pads of the processing system 10a may thus be safety-critical pins/pad, i.e. pins/pads which may generate critical situations when driven incorrectly. For example, in FIG. 3 is shown schematically a first safety-critical pin $SCP_1$ which is driven by the processing unit 102 and a second safety-critical pin $SCP_2$ which is driven by a resource 106, such as a communication interface or a PWM half-bridge driver.

Generally, each input/output pin/pad of the processing system 10a is usually associated with a respective driver circuit 110, which is configured to drive the respective pin/pad as a function of the signal received from the respective block, e.g. the processing system 102 and the hardware resources 106. Generally, between the driver circuits 110 and the blocks of the processing system 10a may also be arranged a dedicated logic, such as a crossbar, permitting a configuration of the pin-mapping.

Accordingly, in various embodiment, the driver circuit 110 of the safety-critical pins/pads SCP is configured to set the output level of the respective pin to a given safety state in response to a signal SET. The output level, such as a high-impedance state or a given logic level (high or low), may depend on the specific application needs. In various embodiments, the "safety state" is intended to be compliant to the description provided by the ISO2626 specification.

Accordingly, in various embodiments, the fault collection circuit 108 may be configured to generate also the signal SET for the driver circuits no in order to put one or more of the safety-critical pins/pads SCP into a safety state. For example, in various embodiments, the signal SET may correspond to the signal ET. Alternatively, the circuit 1084 may be configured to generate the signal SET as a function of the error bits EB and possible one or more configuration bits stored in the register 1080 (similar to the bits ETE).

Accordingly, in the embodiment considered, the forwarding of the errors ERR to the error pin EP (and thus an external device) and optionally the switching of the pins/pads SCP are independent from the operation of the processing unit 102, e.g. the software executed by a microprocessor 102.

As mentioned before, in addition to controlling the external behavior of the processing system 10a (error pins EP and optional safety-critical pins SCP), the fault collection circuit 108 may also generate one or more internal signals, such as the generation of a (non-maskable or maskable/configurable) interrupt signal IRQ and/or a reset signal RST, the activation of a debug mode, etc. For example, the one or more interrupts IRQ may be provided to the processing unit 102 in order to trigger a given software routine, while the reset signal RST may reset one or more circuits of the processing system 10a (or possibly the complete processing system 10a).

Generally, the error trigger signal ET may also be used for this purpose. Conversely, in the embodiment considered, the fault collection circuit 108 includes an additional internal reaction circuit 1082. Specifically, in the embodiment considered, the internal reaction circuit 1082 is configured to generate one or more interrupt signals IRQ and/or reset signals RST as a function of the error bits EB or directly the signals ERR. Generally, the internal reaction circuit 1082 is purely optional, because the processing system 10a may also not perform any internal reaction in response to the error signals ERR.

Also the behavior of the internal reaction circuit 1082 may be programmable, e.g. by setting one or more configuration bits in the register 1080. For example, in the embodiment considered, the register includes (in addition to the error trigger enable bits ETE) a respective interrupt enable bit IE for each of the error signals ERR1, ERR2, ERR3. For example, in various embodiments, the content of these interrupt enable bits IE may be programmed by the processing unit 102 and/or during a configuration phase of the processing system 10a, e.g. by reading the corresponding configuration information from a non-volatile memory, such as the memory 104a.

In order to simplify the data exchange between the processing unit 102 and the registers 1080, the register 1080 may be directly addressable by the processing unit 102, so called special function register of the processing unit 102.

Accordingly, in the embodiment considered, the fault collection circuit 108 is configured to generate a combined error signal ET (e.g., in the form of a trigger signal) at the error pin EP as a function of the error signals ERR. Accordingly, the error pin EP may be connected to an external device, such as another processing system, which e.g. may perform one or more steps in response to the combined error signal/error trigger ET.

The information provided by the error pin EP may thus be safety critical itself. For example, in the automobile sector, the ISO 26262 standard "Road vehicles—Functional safety" dictates the rules to be followed in order to classify a system as safety compliant. The real implementation of those rules is up to the system designers, which can translate them in different architecture.

For example, a possible solution for a fault collection circuit 108 able to handle an error pin EP is described in document "AN4247 Application note Safety Manual for SPC570S family", STMicroelectronics, July 2015, DocID 024209 Rev 3. Specifically, in this document is described a fault collection circuit 108 having two external error pins/pads (see in particular section "4.5 Error Out Monitor (ERRM)"), i.e. an error pin EP1 and an error pin EP2. Specifically, the error signal ET provided to both error pins/pads EP1/EP2 is the same, i.e. for the fault free state of the pins/pads the external device should detect the same signals. Thus, the external device may also detect if the error pins EP1/EP2 are not working properly. For example, such a two pin configuration permits that the external device may detect a pin failure without dedicated software, e.g. through a combinatorial logic (e.g. an XOR port).

The inventor has however observed that such a two-pin configuration may be too limiting for a wide spectrum of applications.

Figure 5:
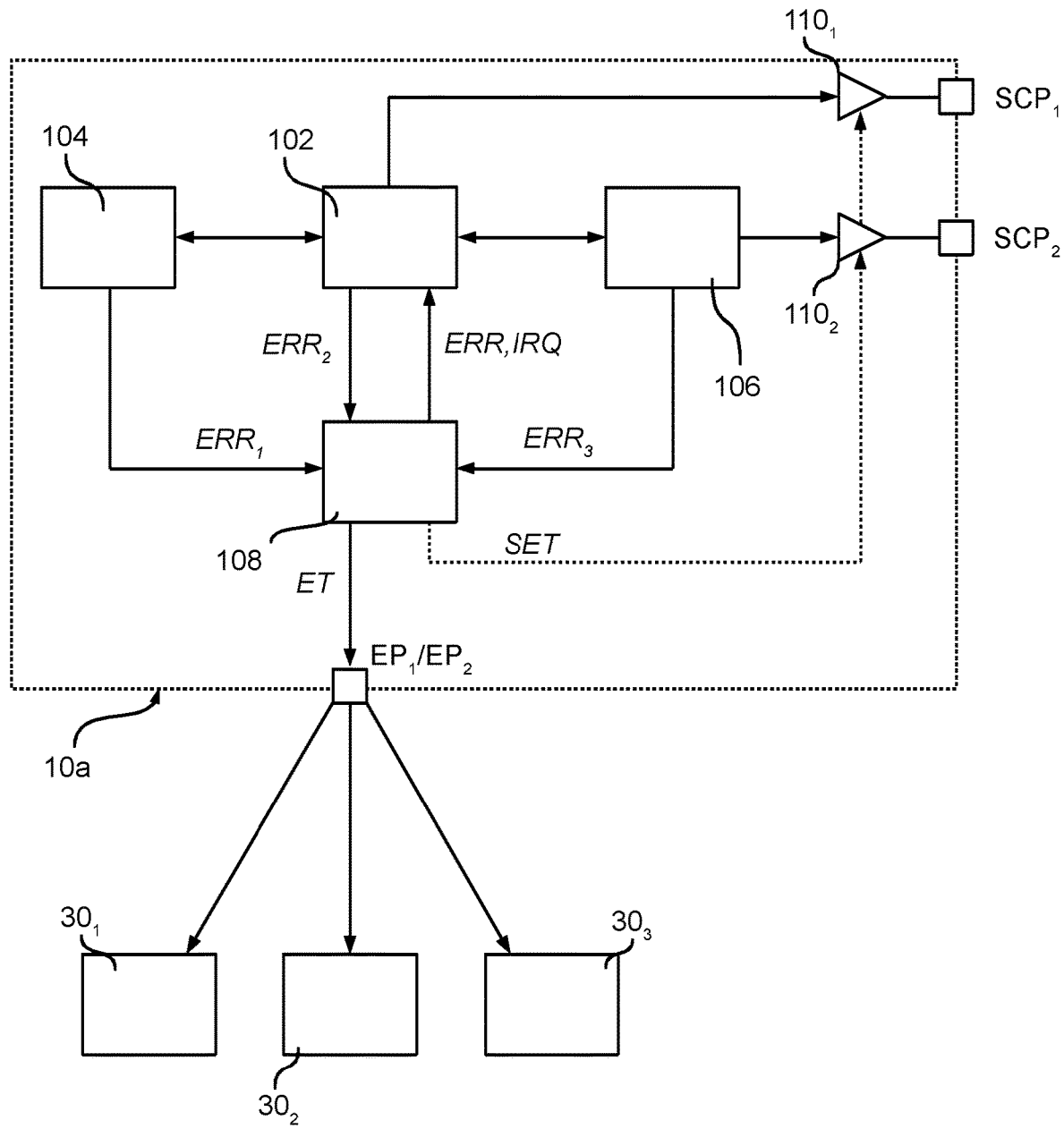
FIG. 5 shows an embodiment of a system wherein the combined error signal of FIG. 3 is provided to one or more external devices.

For example, FIG. 5 shows an example, wherein the fault collection circuit 108 generates again an error signal ET as a function of one or more internal error signal ERR (i.e. internal with respect to the processing system 10a). Specifically, in the example considered, the combined error signal ET is provided to a plurality of external devices, such as device 301, 302 and 303. Specifically, these devices 30 may be configured to perform different operations in response to different errors. For example, the device 301 may restart the processing system 10a in a down-grade/safety state, or may switch off the processing system 10a and switch to a redundant processing system 10a.

However, when using a single error pin EP or two redundant error pads/pins $EP_1/EP_2$ the same combined error signal ET is provided to all external devices 30. Accordingly, the inventor has observed that it would be useful that the error pins/pads EP used to report externally an internal failure ERR are increased. Moreover, is would be advantageously that the processing systems 10a renders it possible to configure individually for each error pin or couple of error pins EP the respective error types to be reported. For example, the device 301 may handle given hardware errors of the processing system 10a, while the device 302 may be a reporting module configured to merely collect any kind of error signal.

In this respect, the inventor has observed that also the number of pins/pads assigned to each error type should preferably be configurable, insofar as not all errors may contain safety relevant information. For example, the errors reported to the device $30_1$ may be safety relevant, thus using two redundant error pins, while the combined error signals provided to the devices $30_2$ and $30_3$ may only be reported via a single error pin.

In the following will thus be described an embodiment of a fault collection circuit 108 configured to control the routing of the internal error signals ERR to a plurality of pre-assigned error pins/pads EP taking into account also the type of failure/error. In various embodiments, the fault collection circuit 108 is also able to generate the control signals in order to control operation of one or more safety-critical pins/pads SCP.

Figure 6:
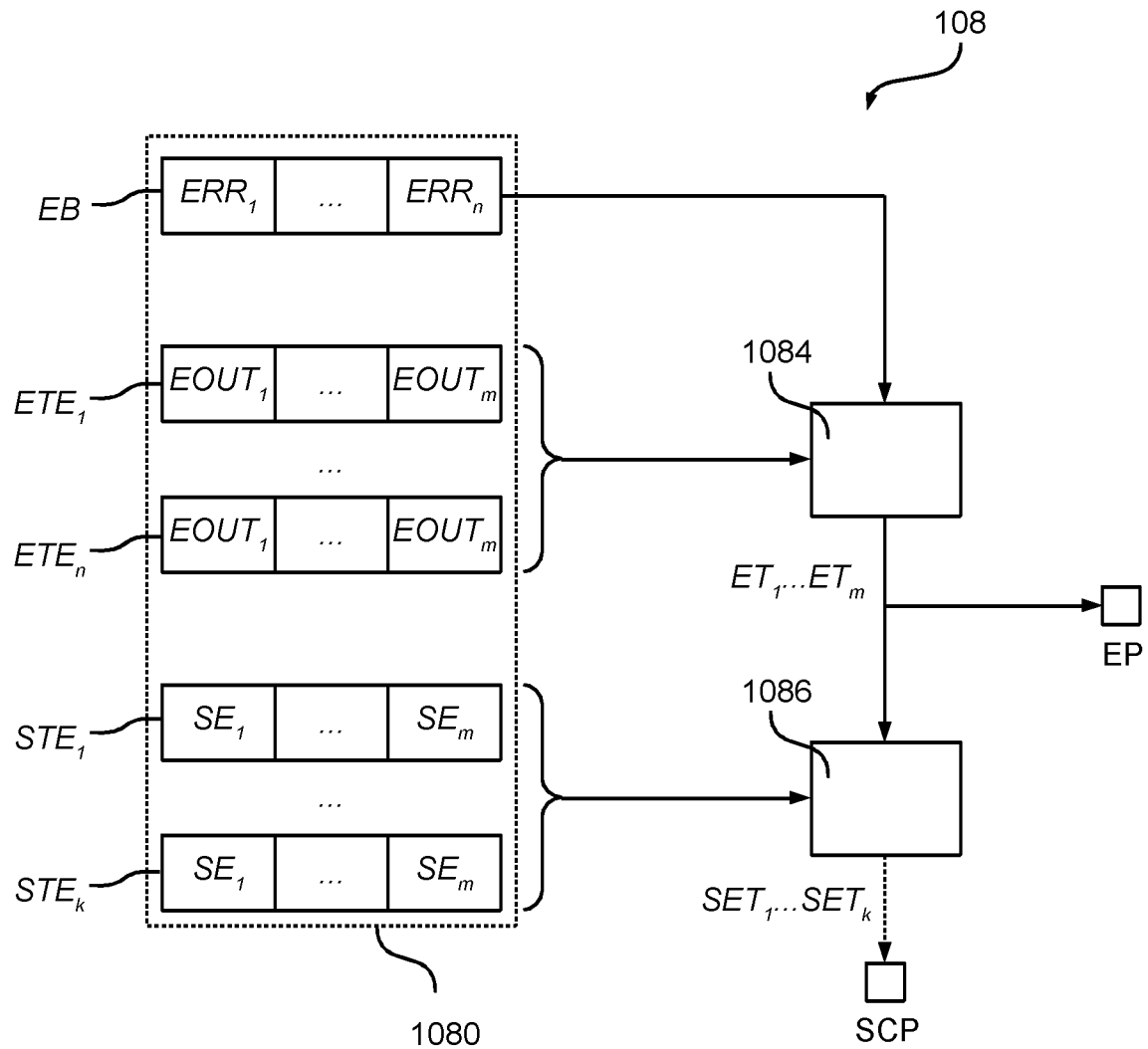
FIGS. 6, 7 and 8 show a second embodiment of the fault collection circuit of FIG. 3.

Specifically, FIG. 6 shows an embodiment of a fault collection circuit 108 configured to receive at input a given number n of error signals $ERR_1, \ldots, ERR_n$ and generate at output:

a first group of a given number m of combined error signals $ET_1, \ldots, ET_m$ for a corresponding number of error pins/pads EP, and a second group of a given number k of safety control signals $SET_1, \ldots, SET_k$ for a corresponding number of safety-critical pins/pads SCP.

In various embodiments, the number n of error signals is greater than the number m of error pins/pads EP. Conversely, the number k of safety-critical pins/pads SCP may be greater than the number m of error pins/pads EP. For example, in various embodiments, the processing system 10a includes m=4 error pins/pads EP and k=32 safety-critical pins/pads SCP.

In the embodiment considered, the fault collection circuit 108 includes again a register 1080 including a given number n of error bits EB for storing the error signals $ERR_1 \ldots ERR_n$. In the embodiment considered, the error bits EB are again provided to an error trigger generator circuit 1084. Generally, the error bits EB are purely optional insofar as the error trigger generator circuit 1084 may also receive at input directly the error signals $ERR_1 \ldots ERR_n$.

Specifically, in the embodiment considered, the error trigger generator circuit 1084 is configured to generate the m combined error signals $ET_1 \ldots ET_m$ as a function of the error type. Accordingly, generally, the error trigger generator circuit 1084 is configured to selectively route the error signals ERR to the error pins EP. For this purpose, the circuit 1084 may be associated with respective configuration information enabling the error signals ERR to be routed to the error pins EP.

Specifically, in the embodiment considered, the register 1080 includes for each error signal $ERR_1 \ldots ERR_n$ a respective set $ETE_1 \ldots ETE_n$ of routing information bits for the respective error signal ERR. Specifically, in the embodiment considered, each set of routing information bits ETE include a respective bit EOUT for each error pin EP, i.e. each set of routing information bits $ETE_1 \ldots ETE_n$ includes respective bits $EOUT_1 \ldots EOUT_m$. Accordingly, the bits $EOUT_1 \ldots EOUT_m$ of a given set of routing information bits ETE indicate the error pads $EP_1 \ldots EP_m$ to which the respective error signal ERR has to be routed.

Figure 7:
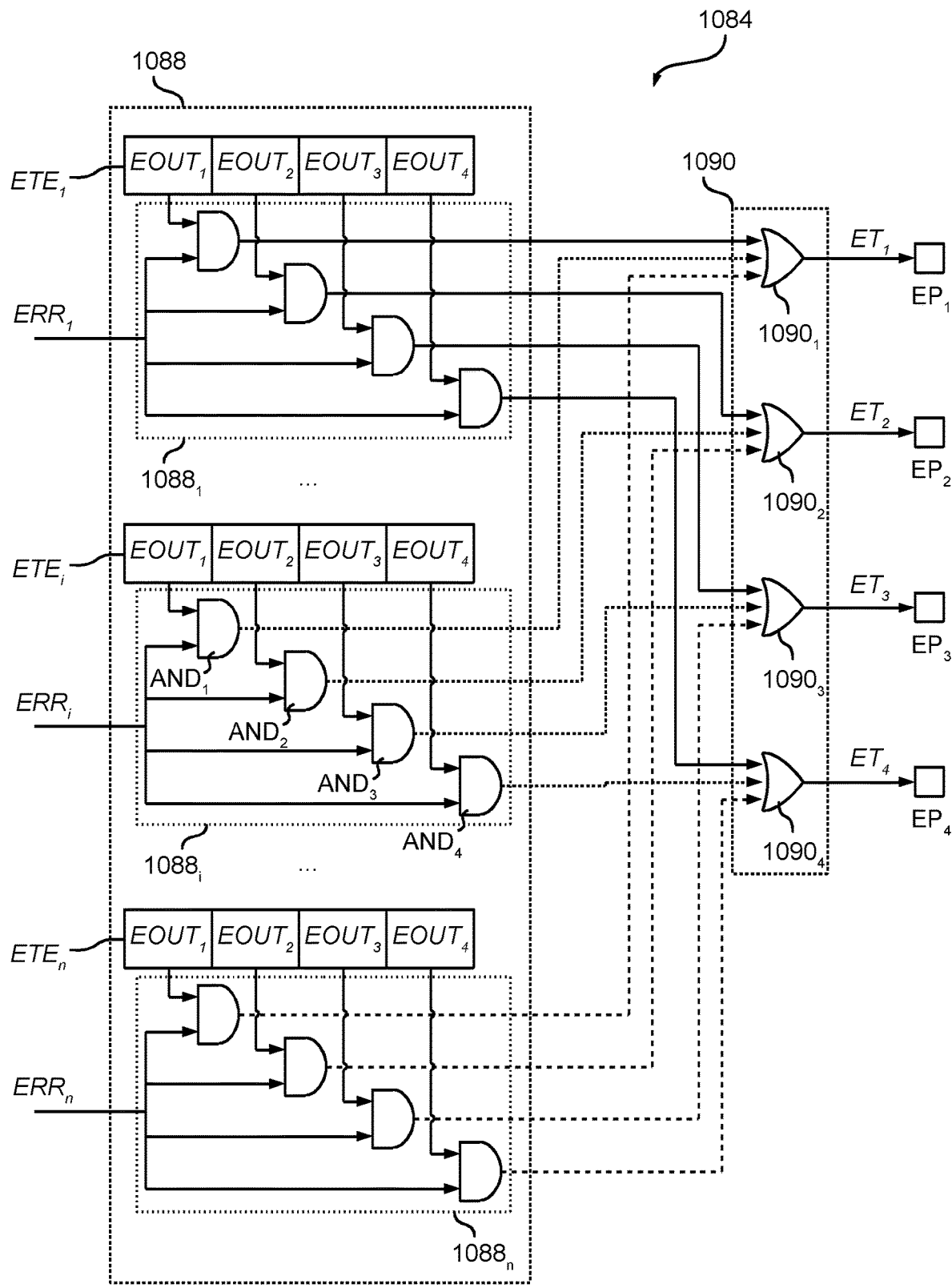

FIG. 7 shows a possible embodiment of the error trigger generator circuit 1084.

Specifically, as mentioned before, the error trigger generator circuit 1084 is implemented with a combinational circuit, which receives at input the error signals $ERR_1 \ldots ERR_n$/error bits EB and provides at output the combined error signals $ET_1 \ldots ET_m$, for example four combined error signals $ET_1$, $ET_2$, $ET_3$ and $ET_4$ for four error pins $EP_1$, $EP_2$, $EP_3$ and $EP_4$.

In the embodiment considered, the error trigger generator circuit 1084 includes for each error signal $ERR_1 \ldots ERR_n$ a corresponding combinational circuit $\mathbf{1088_1} \ldots \mathbf{1088_n}$. Specifically, each of the circuits $\mathbf{1088_1} \ldots \mathbf{1088_n}$ receives at input a respective error signal ERR and provides at output m signals, one for each combined error signal ET/error pin EP. Specifically, each of the m signals is generated by combining the respective error signal ERR with a respective bit $EOUT_1 \ldots EOUT_m$ of the set of routing information bits $ETE_1 \ldots ETE_m$ associated with the respective error signal ERR. Thus, a given circuit $\mathbf{1088_i}$ (with i=1 . . . n) is configured to:

receive at input the respective error signal $ERR_i$ and the bits $EOUT_1 \ldots EOUT_m$ of the respective set of routing information bits $ETE_i$, and generate each of the m trigger signals by performing a logic combination of the error signal $ERR_i$ with a respective bit $EOUT_1 \ldots EOUT_m$ of the set of routing information bits $ETE_i$.

For example, assuming that the error signal ERR is set to high when an error occurs and a bit EOUT is set to high for enabling the forwarding of the error signal, each of the m signals may result from a logic AND operation between the error signal $ERR_i$ with a respective bit EOUT1 . . . EOUTm of the set of routing information bits $ETE_i$. For example, in FIG. 7 are shown four AND gates $AND_1$, $AND_2$, $AND_3$ and $AND_4$, which thus provide at output the following signals: $ERR_i$ AND $EOUT_1$, $ERR_i$ AND $EOUT_2$, $ERR_i$ AND $EOUT_3$ and $ERR_i$ AND $EOUT_4$.

In the embodiment considered, the error trigger generator circuit 1084 includes moreover a combinational logic circuit 1090 configured to combine the signals provided by the circuits $\mathbf{1088_1} \ldots \mathbf{1088_n}$, which belong to the same error pin EP. For example, in the embodiment considered, the circuit 1090 includes for each error pin $EP_1 \ldots EP_m$ a respective sub-circuit $\mathbf{1090_1} \ldots \mathbf{1090_m}$. Specifically, each sub-circuit $\mathbf{1090_j}$ (with j=1 . . . m) receives at input the j-th signal from each circuit $\mathbf{10881} \ldots \mathbf{1088n}$ and provides at output the combined error signal $ET_j$ for the respective error pin $EP_j$.

For example, again assuming the exemplary logic levels described in the foregoing, each of the sub-circuit $\mathbf{1090_1} \ldots \mathbf{1090_m}$ may be implemented with a logic OR gate. Accordingly, in the embodiment considered, the error signals ET may be expressed as:

$$ET_j = OR_{(i=1 \ldots n)} \{EOUT_{j,i} \text{ AND } ERR_i\}$$

where $EOUT_j,i$ indicates that the corresponding bit $EOUT_j$ belongs to the set of routing information bits $ETE_i$. For example, in the exemplary embodiment, the combined error signal $ET_1$ may be expressed as:

$$ET_1 = EOUT_{1,1} \text{ AND } ERR_1 \text{ OR } EOUT_{1,2} \text{ AND } ERR_2 \text{ OR } EOUT_{1,3} \text{ AND } ERR_3 \text{ OR } EOUT_{1,4} \text{ AND } ERR_4.$$

Thus, by setting the bits EOUT of a set of routing information bits $ETE_i$, the system and/or software developer may select the error pins EP to which a given error signal $ERR_i$ should be routed. Generally, the bits EOUT of the set of routing information bits ETE may be organized in various modes. For example, each set of routing information bits ETE may be stored in a respective register, i.e. one for each error signal ERR. Similarly, all bits EOUT associate with a given error pin EP may be stored in a respective register, i.e. one for each error pin/pad EP.

For example, only critical hardware errors may be routed to the error pin $EP_1$, e.g. by setting the bit $EOUT_1$ of the set of routing information bits ETE associated with critical errors, such as hardware errors. Conversely, any kind of error may be routed to the error pin $EP_3$, e.g. by setting the bit $EOUT_3$ of each set of routing information bits ETE, i.e. for all errors.

Thus, in various embodiments, a safety critical configuration may be obtained by using the same bit configuring for two error pins EP, e.g. $EOUT_3 = EOUT_1$ for each set of routing information bits ETE. For example, the error pin $EP_3$ may be configured as redundant pin for the error pin $EP_1$ by setting the bit $EOUT_3$ of the set of routing information bits ETE associated with the same critical errors, i.e. an error pin is configured as redundant when all bits EOUT associated with the pin have the same value as the bits EOUT associated with another error pin.

As mentioned before, the fault collection circuit 108 may also be configured to control the operation of safety-critical pins/pads SCP. For example, FIG. 6 shows that the fault collection circuit 108 may also include a further combinational circuit 1086 configured to control the operation of one or more safety-critical pads/pins SCP. Specifically, in the embodiment considered, the circuit 1086 is configured to control the operation of the safety-critical pins/pads SCP by selectively routing the error trigger signals ET to the safety-critical pins SCP. Accordingly, the circuit 1086 receives at input the m combined error signals $ET_1 \ldots ET_m$ and provides at output the k safety control signals $SET_1 \ldots SET_k$ for the safety-critical pins/pads SCP.

Figure 8:
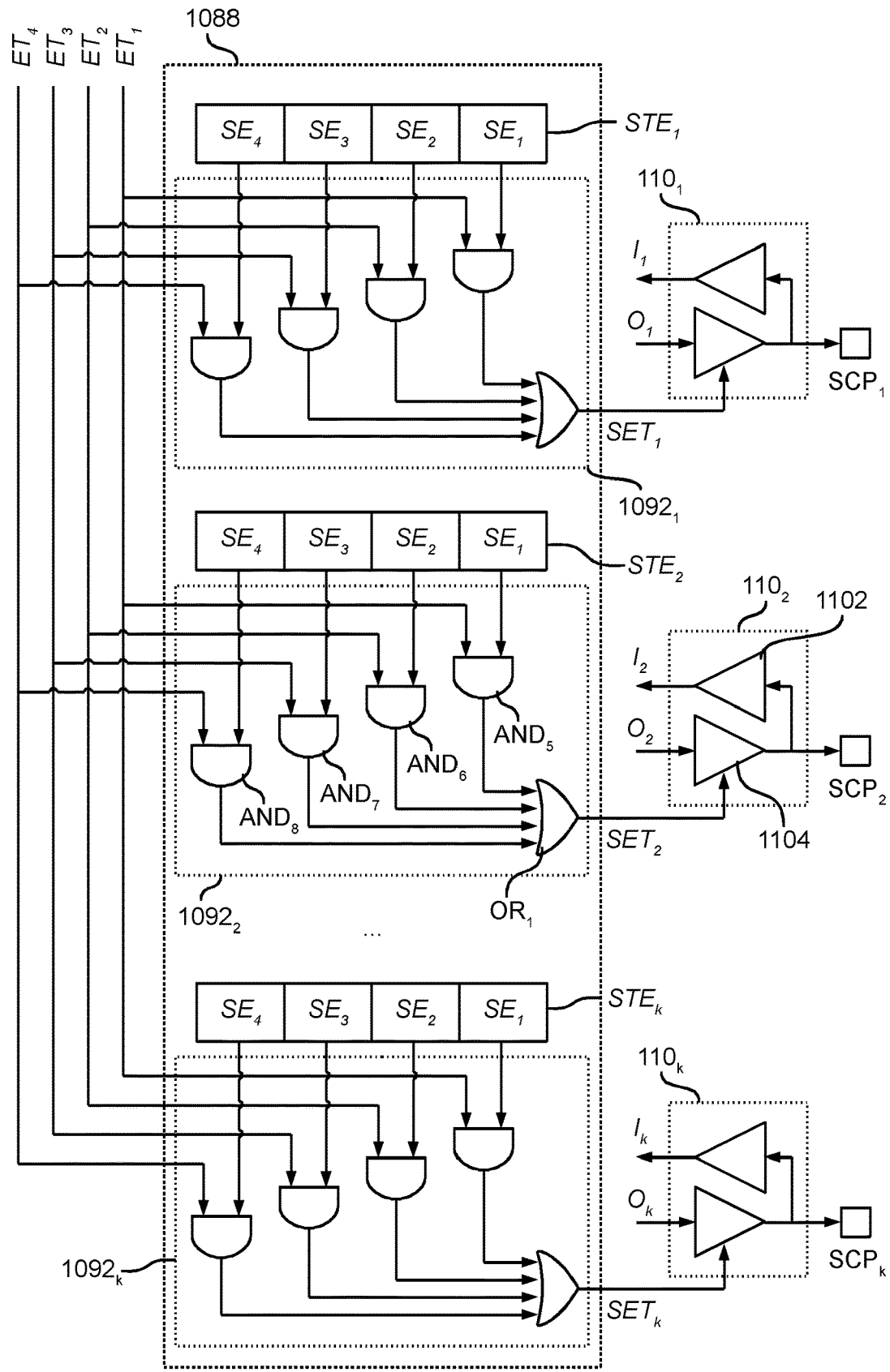

For example, FIG. 8 shows a possible embodiment of the circuit 1086.

Specifically, as mentioned before, the combinational logic circuit 1084 receives at input the combined error signals $ET_1 \ldots ET_m$, for example four error trigger signals $ET_1$, $ET_2$, $ET_3$ and $ET_4$, and provides at output the safety control signals $SET_1 \ldots SET_k$ for the safety-critical pins/pads $SCP_1 \ldots SCP_k$.

In the embodiment considered, the circuit 1086 includes for each safety control signal $SET_1 \ldots SET_k$ a corresponding combinational circuit $\mathbf{1092_1} \ldots \mathbf{1092_k}$. Specifically, each of the circuits $\mathbf{1092_1} \ldots \mathbf{1092_k}$ receives at input the combined error signals $ET_1 \ldots ET_m$ generated by the circuit 1084 and provides at output a respective safety control signal $SET_1 \ldots SET_k$.

Specifically, in the embodiment considered, the routing of the combined error signals $ET_1 \ldots ET_m$ within each circuits 10921 (with l=1 . . . k) may be specified via a respective set of safety routing information bits $STE_l$, i.e. $STE_1 \ldots STE_k$, specifying the combined error signals $ET_1 \ldots ET_m$ to be routed to the respective safety-critical pin/pad SCP.

For example, in various embodiments, each circuit 10921 may implement a multiplexer and the respective set of routing information bits $STE_l$ is used to select one (or possibly none) of the combined error signals $ET_1 \ldots ET_m$ to be routed to the respective safety-critical pin/pad $SCP_l$.

Conversely, in the embodiment shown in FIG. 8, the set of routing information bits $STE_l$ for a given safety-critical pin/pad $SCP_l$ includes a respective enable bit $SE_1 \ldots SE_m$ for each combined error signal $ET_1 \ldots ET_m$ indicating whether the respective error trigger signal $ET_1 \ldots ET_m$ should be forwarded to the given safety-critical pin/pad $SCP_l$.

For example, again assuming that the routing is enabled when the respective enable bit SE is set to high, each block 10921 may implement the following logic operation:

$$SET_l = OR_{(j=1 \ldots m)}\{SE_{j,l} \text{ AND } ET_j\}$$

where $SE_{j,l}$ indicates that the corresponding bit $SE_j$ belongs to the set of routing information bits STEl. For example, in the exemplary embodiment, the safety control signal SET1 may be expressed as:

$$SET1 = SE1,1 \text{ AND } ET1 \text{ OR } SE2,1 \text{ AND } ET2 \text{ OR } SE3,1 \text{ AND } ET3 \text{ OR } SE4,1 \text{ AND } ET4.$$

For example, again assuming four combined error signals ET, each block 10921 may include four logic AND gates $AND_5, AND_6, AND_7$ and $AND_8$ and a logic OR gate $OR_1$ for implementing the above equations.

Generally, the safety control signals SET may not necessarily be identical to the respective error trigger signal ET, but the signal may also correspond, e.g., to an inverted version of the respective combined error signal ET. For example, for this purpose, the AND operations may be replaced with XOR operations.

In the embodiment considered, each safety control signals SET is provided to a respective safety-critical pin/pad SCP for controlling the state of the pin. Specifically, each pin of the processing system 10a is usually associated with an interface circuit no. Specifically, as shown with respect to the interface 1102, an interface circuit no of a safety-critical pin SCP includes an output buffer 1104 for driving the respective pin SCP as a function of an output signal O. In case of an input/output pin, the interface circuit no may also include an input buffer $110_2$ for acquiring an input signal I indicate of the signal applied to the respective pin. For example, in order to use the pin as input pin, the output buffer 1104 may be deactivated, thereby placing the pin in a high-impedance state. For example, in case of digital signals I and O, the input buffer 1102 and output buffer 1104 may be implemented with Schmitt triggers. However, generally, the output signal O may also be an analog signal.

In the embodiment considered, the output buffer 1104 of a given safety-critical pin SCP may thus be configured to drive the respective pin SCP as a function of the respective safety control signal SET. For example, the output buffer 1104 may set the electric level of the respective safety-critical pin, e.g. to a given logic level (e.g. high or low) or to a high-impedance state. In various embodiments, each set of routing information bits STEl may thus contain also one or more bits (which are provided to the respective output buffer 1104) for configuring the electric level to which the respective safety-critical pin SCP should be set in case the respective safety control signal SET is set.

Thus, by setting the bits $SE_i$ of the set of safety routing information bits $STE_l$, the system and/or software developer may decide which combined error signals ET should be router to which safety-critical pin SCP, thereby controlling the operation of the safety-critical pins SCP, in particular in order to place the safety-critical pins SCP in a safety state. For example, as mentioned before, only critical hardware error may be routed to the error pin EP1, in order to take suitable measures in order to maintain the whole system in a safety state. Conversely, any kind of error may be routed to the error pin EP2, e.g. in order to implement an error log function. Accordingly, in this case, the information provided to the pin $EP_1$ is safety relevant and the designer may set the bit $SE_1$ of the set of safety routing information bits $STE_1$ in order to forward the combined error signal $ET_1$ not only to the error pin $EP_1$, but also to one or more safety-critical pins SCP (in particular the respective interface circuit no), thereby placing the respective safety-critical pin SCP in a safety state.

Also in this case, the bits SE of the set of routing information bits STE may be organized in various modes. For example, each set of routing information bits STE may be stored in a respective register, i.e. one for each safety control signal SET. Similarly, all bits SE associate with a given combined error signal ET may be stored in a respective register, i.e. one for each combined error signal ET.

In the previous embodiments, the combined error signals ET and the safety control signals SET have thus a first logic level (e.g. low) when none of the errors enabled via the bits EOUT and SE is set. Conversely, the combined error signals ET and the safety control signals SET have a second logic level (e.g. high), when at least one of the errors is enabled via the bit EOUT and the respective bit SE is set.

Figure 9:
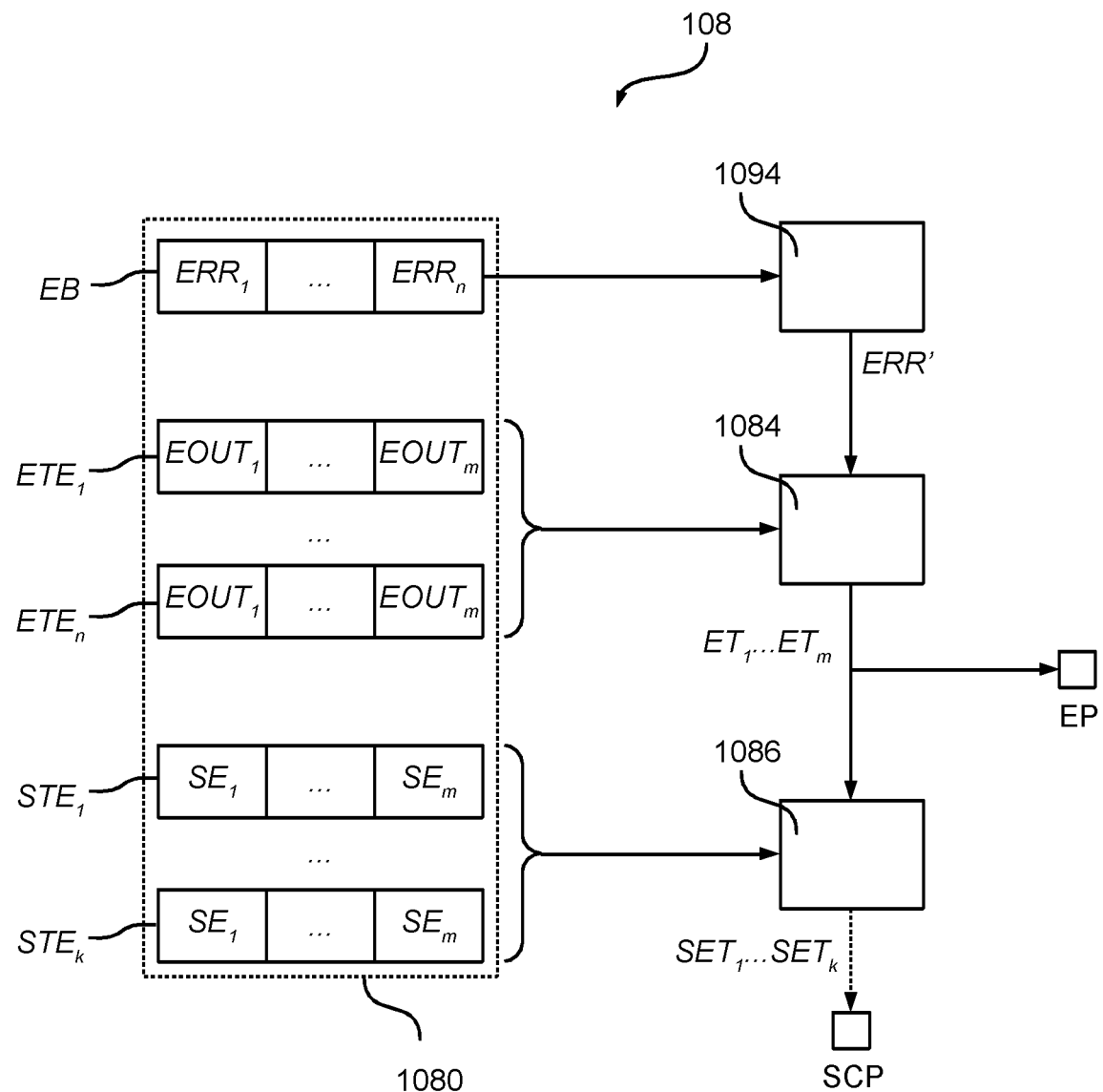
FIG. 9 shows a third embodiment of the fault collection circuit of FIG. 3.

Conversely, FIG. 9 shows an embodiment, wherein the error trigger generator circuit 1084 does not receive at input directly the error bits EB or the error signals ERR, but an additional circuit 1094 is connected between the error bits EB/the error signals ERR and the error trigger generator circuit 1084.

Specifically, as mentioned before, the circuits 1084 and 1086 essentially correspond to two routing circuits, i.e.:
- the routing circuit 1084 is configured to forward the signals received at input to the error pins EP as a function of the configuration bits EOUT; and
- the routing circuit 1086 is configured to forward the signals at the output of the routing circuits 1084 to the safety-critical pins SCP as a function of the configuration bits SE.

Accordingly, the circuit 1094 may perform different operations on the error bits EB/the error signals ERR before the processed data ERR' are provide at input to the routing circuit 1094. For example, the circuit 1094 may be configured to:
- select only a subset of the error signals ERR and/or combine a plurality of error signals ERR, thereby reducing the number of signals ERR' provided to the routing circuit 1084; and/or
- mask given errors ERR, i.e. these errors are never signaled to the circuit 1084; and/or
- trigger a given error ERR, e.g. for test purposes.

Accordingly, the register 1080 may also include one or more configuration bits for configuring the operation of the circuit 1094.

In various embodiments, the circuit 1094 may generate for each error signal ERR a respective serial bit sequence when the respective error signal ERR is set, wherein a different bit sequence is associated with each error signal ERR. Accordingly, instead of providing an undistinguishable error trigger signal ET at each error pin EP, each signal ET may indeed correspond to a bit sequence indicative of a respective error.

Accordingly, generally, the processing system 10a includes at least two error pins EP (m≥2). In the embodiment described, the fault collection circuit 108 receives at input a plurality of error signal ERR generated by the various circuits of the processing system 10a, and generates combined error signals ET for the error pins EP. Specifically, the fault collection circuit 108 is configured to selectively forwards the error signals ERR to the error pins EP. For this purpose, the fault collection circuit 108 includes a first routing circuit 1084 configured to generate the combined error signals ET by selectively forwarding the error signals ERR to the error pins EP as a function of a first set of configuration bits EOUT.

In various embodiments, one or more (k≥1) pins of the processing system 10a are safety-critical pin SCP associated with an interface circuit configured to selectively set the electric level of the respective pin as a function of a safety control signal SET. In this case, the fault collection circuit 108 generates also the safety control signals SET for the safety-critical pins SCP. Specifically, in various embodiments, the fault collection circuit 108 includes also a second routing circuit 1086 configured to generate the safety control signals SET by selectively forwarding the combined error signals ET to the safety-critical pins SCP as a function of a second set of configuration bits SE.

As mentioned before, the fault collection circuit 108 may also be configured to store (via the register 1080) the error signals ERR and/or elaborate the error signals ERR (via the circuit 1094) before the signals are provided to the first circuit 1084.

Of course, without prejudice to the principle of the invention, the details of construction and the embodiments may vary widely with respect to what has been described and illustrated herein purely by way of example, without thereby departing from the scope of the present invention.

What is claimed is:

1. A processing system, comprising:
a plurality of circuits configured to produce a plurality of error signals, each of the plurality of circuits being configured to generate a respective error signal of the plurality of error signals;
a first error pad;
a second error pad; and
a fault collection circuit configured to receive, at an input of the fault collection circuit, the plurality of error signals and configured to generate a combined error signal for the first error pad and a combined error signal for the second error pad, wherein the fault collection circuit comprises:
a first combinational logic circuit configured to generate the combined error signal for the first error pad and the combined error signal for the second error pad, the combined error signal for the first error pad comprising a first selection of error signals and the combined error signal for the second error pad comprising a second selection of error signals, the first selection of error signals and the second selection of error signals being selected as a function of a first set of configuring bits.

2. The processing system according to claim 1, wherein the first combinational logic circuit comprises a first combinational sub-circuit and a second combinational sub-circuit the first combinational sub-circuit being configured to:
receive, at an input of the first combinational sub-circuit, a first error signal from a first circuit of the plurality of circuits, and receive a first plurality of configuration bits, wherein the first set of configuring bits comprises the first plurality of configuration bits; and
generate, a respective a first combinational sub-circuit output signal for the first error pad by performing a first logic operation between the first error signal and a first configuration bit of the first plurality of configuration bits and generate a first combinational sub-circuit output signal for the second error pad by performing a second logic operation between the first error signal and a second configuration bit of the first plurality of configuration bits; and
the second combinational sub-circuit being configured to:
receive, at an input of the second combinational sub-circuit, a second error signal from a second circuit of the plurality of circuits, and receive a second plurality of configuration bits, wherein the first set of configuring bits comprises the second plurality of configuration bits; and
generate, a second combinational sub-circuit output signal for the first error pad by performing a third logic operation between the first error signal and a first configuration bit of the second plurality of configuration bits and generate a second combinational sub-circuit output signal for the second error pad by performing a fourth logic operation between the second error signal and a second configuration bit of the second plurality of configuration bits.

3. The processing system according to claim 2, wherein the first combinational logic circuit further comprises a third combinational sub-circuit and a fourth combinational sub-circuit, the third combinational sub-circuit being configured to:
receive, at an input of the third combinational sub-circuit, the first combinational sub-circuit output signal for the first error pad and the second combinational sub-circuit output signal for the first error pad; and
generate the combined error signal for the first error pad by combining the first combinational sub-circuit output signal for the first error pad the second combinational sub-circuit output signal for the first error pad; and
the fourth combinational sub-circuit being configured to:
receive, at an input of the fourth combinational sub-circuit, the first combinational sub-circuit output signal for the second error pad and the second combinational sub-circuit output signal for the second error pad; and
generate the combined error signal for the second error pad by combining the first combinational sub-circuit output signal for the second error pad the second combinational sub-circuit output signal for the second error pad.

4. The processing system according to claim 3, wherein the first logic operation is an AND operation, and wherein the third logic operation is an OR operation.

5. The processing system according to claim 2, wherein the first set of configuring bits comprising a first plurality of configuration bits.

6. The processing system according claim 1, further comprising a safety-critical pad, wherein the safety-critical pad is associated with an interface circuit configured to set an electric level of the safety-critical pad as a function of a safety control signal.

7. The processing system according to claim 6, wherein the fault collection circuit is configured to generate the safety control signal for the safety-critical pad.

8. The processing system according to claim 7, wherein the fault collection circuit comprises a second combinational logic circuit configured to generate the safety control signal by selectively routing the combined error signal for the first error pad and the combined error signal for the second error pad to the safety-critical pad as a function of a second set of configuring bits.

9. The processing system according to claim 8, wherein the second combinational logic circuit comprises combinational sub-circuit for the safety-critical pad, wherein the combinational sub-circuit is configured to:
  receive the combined error signal for the first error pad and the combined error signal for the second error pad and a third plurality of configuration bits, the second set of configuring bits comprising the third plurality of configuration bits;
  generate a first output signal by performing a fifth logic operation between the combined error signal for the first error pad and a first configuration bit of the third plurality of configuration bits;
  generate a second output signal by performing a-sixth logic operation between the combined error signal for the second error pad and a second configuration bit of the third plurality of configuration bits; and
  generate a safety control signal for safety-critical pad by combining the first output signal and the second output signal via a seventh logic operation.

10. The processing system according to claim 9, wherein the third fifth logic operation is an AND operation, and wherein the seventh logic operation is an OR operation.

11. The processing system according to claim 9, wherein the second set of configuring bits comprising the third plurality of configuration bits is programmable.

12. The processing system according to claim 1, wherein the plurality of circuits comprises at least one of:
  a memory supporting an error detection, correction function, or both, the memory configured to generate a first error signal when data read from the memory contains errors, when data cannot be written to the memory, or both;
  a processing unit configured to generate a second error signal in response to a hardware failure, a software failure, or both; and
  a communication interface configured to generate a third error signal corresponding to a hard error signal indicative of a hardware failure, a soft error signal indicative of a data transmission error, or both.

13. An integrated circuit, comprising:
  a processing system, comprising:
    a plurality of circuits configured to produce a plurality of error signals, each of the plurality of circuits being configured to generate a respective error signal of the plurality of error signals;
    a first error pad;
    a second error pad; and
    a fault collection circuit configured to receive, at an input of the fault collection circuit, the plurality of error signals and configured to generate a combined error signal for the first error pad and a combined error signal for the second error pad, wherein the fault collection circuit comprises:
      a first combinational logic circuit configured to generate the combined error signal for the first error pad and the combined error signal for the second error pad, the combined error signal for the first error pad comprising a first selection of error signals and the combined error signal for the second error pad comprising a second selection of error signals, the first selection of error signals and the second selection of error signals being selected as a function of a first set of configuring bits.

14. The integrated circuit according to claim 13, wherein the integrated circuit comprises a microcontroller.

15. The integrated circuit according to claim 13, wherein the first combinational logic circuit comprises a first combinational sub-circuit and a second combinational sub-circuit the first combinational sub-circuit being is configured to:
  receive, at an input of the first combinational sub-circuit, a first error signal from a first circuit of the plurality of circuits, and receive a first plurality of configuration bits, wherein the first set of configuring bits comprises the first plurality of configuration bits; and
  generate a first combinational sub-circuit output signal by performing an AND operation between the first error signal and a first configuration bit of the first plurality of configuration bits and generate a first combinational sub-circuit output signal for the second error pad by performing a second logic operation between the first error signal and a second configuration bit of the first plurality of configuration bits; and
the second combinational sub-circuit being configured to:
  receive, at an input of the second combinational sub-circuit, a second error signal from a second circuit of the plurality of circuits, and receive a second plurality of configuration bits, wherein the first set of configuring bits comprises the second plurality of configuration bits; and
  generate, a second combinational sub-circuit output signal for the first error pad by performing a third logic operation between the first error signal and a first configuration bit of the second plurality of configuration bits and generate a second combinational sub-circuit output signal for the second error pad by performing a fourth logic operation between the second error signal and a second configuration bit of the second plurality of configuration bits.

16. The integrated circuit according to claim 15, wherein the first combinational logic circuit further comprises a third combinational sub-circuit and a fourth combinational sub-circuit, the third combinational sub-circuit being configured to:
  receive, at an input of the third combinational sub-circuit, the first combinational sub-circuit output signal for the first error pad and the second combinational sub-circuit output signal for the first error pad; and
  generate the combined error signal for the first error pad by combining the first combinational sub-circuit output signal for the first error pad the second combinational sub-circuit output signal for the first error pad; and
the fourth combinational sub-circuit being configured to:
  receive, at an input of the fourth combinational sub-circuit, the first combinational sub-circuit output signal for the second error pad and the second combinational sub-circuit output signal for the second error pad; and
  generate the combined error signal for the second error pad by combining the first combinational sub-circuit output signal for the second error pad the second combinational sub-circuit output signal for the second error pad.

17. The integrated circuit according to claim 13, wherein the plurality of circuits comprises at least one of:
  a memory supporting an error detection, correction function, or both, the memory configured to generate a first error signal when data read from the memory contains errors, when data cannot be written to the memory, or both;
  a processing unit configured to generate a second error signal in response to a hardware failure, a software failure, or both; and a communication interface configured to generate a third error signal corresponding to a hard error signal indicative of a hardware failure, a soft error signal indicative of a data transmission error, or both.

18. The integrated circuit according to claim 13, wherein the processing system further comprises a safety-critical pad, wherein the safety-critical pad is associated with an interface circuit configured to set an electric level of the safety-critical pad as a function of a safety control signal.

19. A method of operating a processing system, the method comprising:
   providing a first set of configuring bits to the processing system;
   generating, via a plurality of circuits of the processing system, at least one error signal;
   receiving, at an input of a fault collection circuit of the processing system, the at least one error signal; and
   generating, via the fault collection circuit, a respective combined error signal for a first error pad of the processing system by selectively routing the at least one error signal to the first error pad as a function of a first set of configuring bits; and
   generating, via the fault collection circuit, a combined error signal for a second error pad of the processing system by selectively routing the at least one error signal to the second error pad as a function of the first set of configuring bits.

20. The method according to claim 19, wherein the processing system further comprises a safety-critical pad, wherein the safety-critical pad is associated with a respective interface circuit configured to set an electric level of the safety-critical pad as a function of a safety control signal, the method further comprising:
   providing a second set of configuring bits to the processing system; and
   generating, via the fault collection circuit, a safety control signal for the safety-critical pad as a function of the second set of configuring bits.

* * * * *

UNITED STATES PATENT AND TRADEMARK OFFICE
CERTIFICATE OF CORRECTION

PATENT NO. : 11,113,136 B2
APPLICATION NO. : 16/289405
DATED : September 7, 2021
INVENTOR(S) : Roberto Colombo Page 1 of 1

It is certified that error appears in the above-identified patent and that said Letters Patent is hereby corrected as shown below:

In the Claims

Claim 2, Column 13, Line 66; delete "generate, a respective a first" and insert --generate, a first combinational--.

Claim 9, Column 15, Lines 2-3; insert --a-- before "combinational".

Claim 9, Column 15, Line 19; insert --the-- before "safety-critical".

Claim 10, Column 15, Line 23; delete "third" before "fifth".

Claim 19, Column 17, Lines 18-19; delete "respective" before "combined".

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*